(12) United States Patent
Sitti et al.

(10) Patent No.: US 12,344,776 B2
(45) Date of Patent: Jul. 1, 2025

(54) LIQUID REPELLENT FIBRILLAR DRY ADHESIVE MATERIAL AND A METHOD OF PRODUCING THE SAME

(71) Applicant: MAX-PLANCK-GESELLSCHAFT ZUR FÖRDERUNG DER WISSENSCHAFTEN E.V., Munich (DE)

(72) Inventors: Metin Sitti, Stuttgart (DE); Dirk-Michael Drotlef, Sindelfingen (DE); Ville Liimatainen, Ehingen (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 206 days.

(21) Appl. No.: 17/785,452

(22) PCT Filed: Dec. 3, 2020

(86) PCT No.: PCT/EP2020/084461
§ 371 (c)(1),
(2) Date: Jun. 15, 2022

(87) PCT Pub. No.: WO2021/122033
PCT Pub. Date: Jun. 24, 2021

(65) Prior Publication Data
US 2023/0021391 A1   Jan. 26, 2023

(30) Foreign Application Priority Data
Dec. 20, 2019   (EP) ..................................... 19218616

(51) Int. Cl.
*B29C 33/60*   (2006.01)
*B29C 33/38*   (2006.01)
(Continued)

(52) U.S. Cl.
CPC ............. *C09J 7/00* (2013.01); *B29C 33/3842* (2013.01); *B29C 33/3857* (2013.01);
(Continued)

(58) Field of Classification Search
CPC . B29C 33/3842; B29C 33/3857; B29C 33/56; B29C 33/60; B29C 33/62;
(Continued)

(56) References Cited

U.S. PATENT DOCUMENTS

| | | | |
|---|---|---|---|
| 10,391,530 B2 | 8/2019 | Kim et al. | |
| 2009/0061039 A1* | 3/2009 | Zhang | B29C 33/3857 264/227 X |

(Continued)

FOREIGN PATENT DOCUMENTS

| | | |
|---|---|---|
| CN | 101795839 A | 8/2010 |
| WO | 2009029435 A1 | 3/2009 |

(Continued)

OTHER PUBLICATIONS

Extended European Search Report mailed Jul. 2, 2020 for European Application No. 19218616.1, 18 pages.
(Continued)

*Primary Examiner* — Leo B Tentoni
(74) *Attorney, Agent, or Firm* — Dickinson Wright PLLC

(57) ABSTRACT

The invention relates to a method of producing a fibrillary dry adhesive material having a plurality of fibrils. Furthermore, the invention relates to a fibrillar dry adhesive material in particular having liquid super-repellency.

5 Claims, 8 Drawing Sheets

Figure 1:
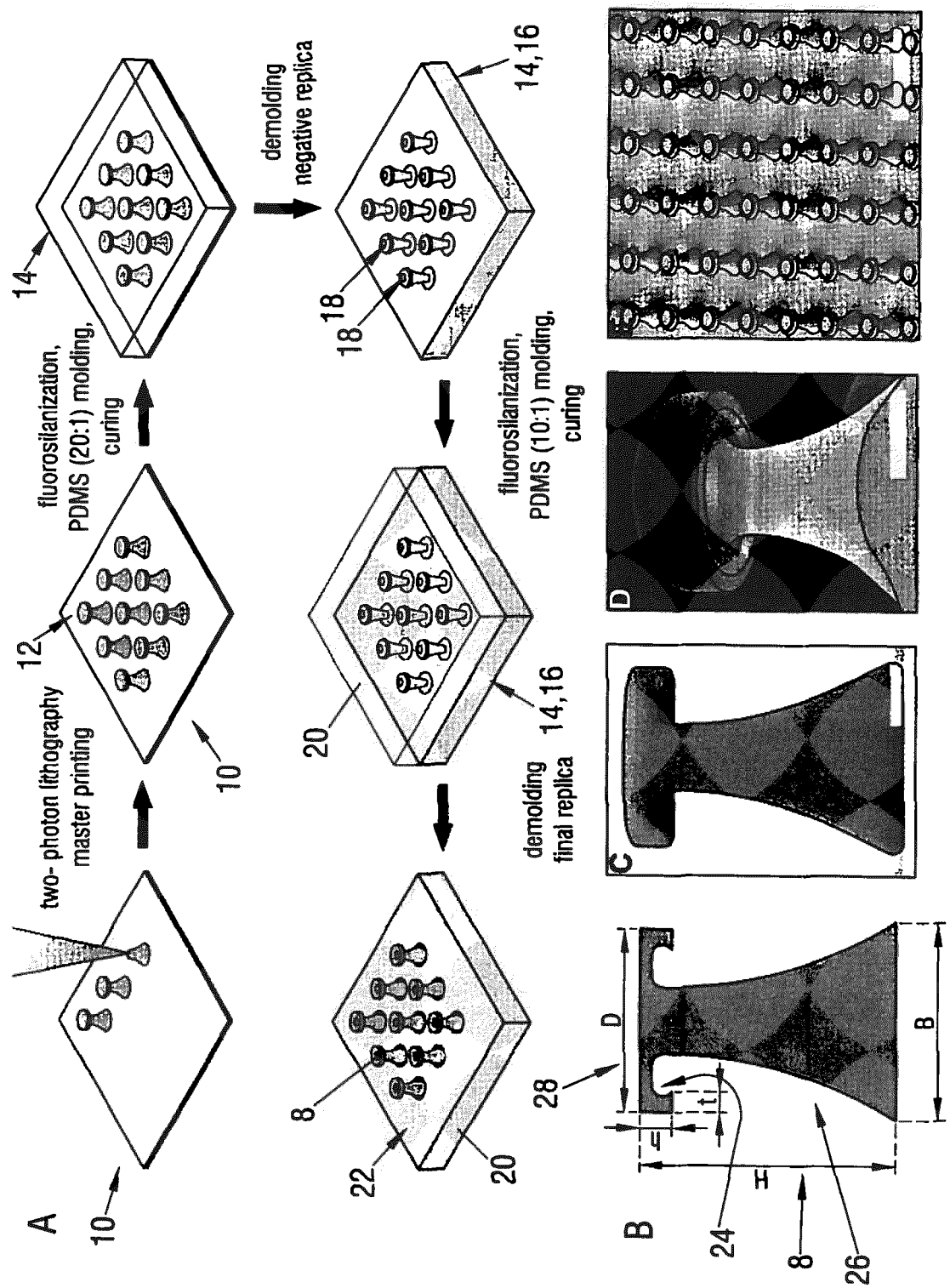

(51) Int. Cl.
    B29C 33/62       (2006.01)
    B29C 39/02       (2006.01)
    B29C 39/26       (2006.01)
    B29C 39/36       (2006.01)
    B29C 41/02       (2006.01)
    B29C 41/38       (2006.01)
    B29C 41/50       (2006.01)
    C09J 7/00        (2018.01)
    C09J 175/04      (2006.01)
    C09J 183/04      (2006.01)
    B29C 33/56       (2006.01)
    B29C 35/02       (2006.01)
    B29C 39/42       (2006.01)

(52) U.S. Cl.
    CPC ........... *C09J 175/04* (2013.01); *C09J 183/04* (2013.01); *B29C 33/56* (2013.01); *B29C 35/02* (2013.01); *B29C 39/026* (2013.01); *B29C 39/42* (2013.01); *C09J 2301/202* (2020.08)

(58) Field of Classification Search
    CPC ....... B29C 35/02; B29C 39/02; B29C 39/026; B29C 39/26; B29C 39/36; B29C 39/42; B29C 41/02; B29C 41/38; B29C 41/50; C09J 2301/202
    USPC ....... 264/101, 219, 220, 221, 225, 226, 227, 264/236, 334, 337, 338
    See application file for complete search history.

(56) References Cited

U.S. PATENT DOCUMENTS

| | | | |
|---|---|---|---|
| 2010/0021647 A1* | 1/2010 | Sitti | B29C 33/3842 427/457 |
| 2010/0252177 A1 | 10/2010 | Sargent et al. | |
| 2014/0015900 A1 | 1/2014 | Zhang et al. | |
| 2014/0329061 A1 | 11/2014 | Lu et al. | |
| 2018/0016136 A1* | 1/2018 | Xu | B81C 1/00357 |
| 2018/0099869 A1 | 4/2018 | Sitti et al. | |

FOREIGN PATENT DOCUMENTS

WO    2013188958 A1    12/2013
WO    2015048504 A2     4/2015

OTHER PUBLICATIONS

International Search Report and Written Opinion mailed Feb. 25, 2021 for International Application No. PCT/EP2020/084461, 23 pages.

Del Campo et al., "Contact Shape Controls Adhesion of Bioinspired Fibrillar Surfaces," Langmuir, vol. 23, No. 20, 2007, 10 pages.

Marvi et al., "Experimental Investigation of Optimal Adhesion of Mushroomlike Elastomer Microfibrillar Adhesives," Langmuir, vol. 31, 2015, 6 pages.

Sitti et al., "Synthetic gecko foot-hair micro/nano-structures as dry adhesives," Journal of Adhesion Science Technology, vol. 17, No. 8, 2003, 20 pages.

Kang et al., "Robust superomniphobic surfaces with mushroom-like micropillar arrays," Soft Matter, vol. 8, 2012, 6 pages.

Wang et al., "Strong Wet and Dry Adhesion by Cupped Microstructures," ACS Applied Materials and Interfaces, vol. 11, 2019, 8 pages.

First Office Action dated Dec. 30, 2023 corresponding to Chinese Application No. 2020800882848, 10 pages.

Hensel, Rene, et al. "Wetting resistance at its topographical limit: the benefit of mushroom and serif T structures." Langmuir 29.4 (2013): 1100-1112.

Third Office Action dated Dec. 10, 2025 and Translation corresponding to Chinese Application No. 2020800882848, 11 pages.

* cited by examiner

LIQUID REPELLENT FIBRILLAR DRY ADHESIVE MATERIAL AND A METHOD OF PRODUCING THE SAME

CROSS-REFERENCES TO RELATED APPLICATIONS

This application is a 371 National Phase Application of Patent Application PCT/EP2020/084461, filed on Dec. 3, 2020 which claims priority to European Patent Application No. 19218616.1, filed on Dec. 20, 2019, each of which is incorporated herein by reference, in their entirety.

The invention relates to a method of producing a liquid repellent fibrillar dry adhesive material having a plurality of fibrils. Furthermore, the invention relates to a fibrillar dry adhesive material in particular having liquid super-repellency.

Certain species of insects, arachnids and reptiles, most notably the gecko lizards, have micro- or nanoscale fibril arrays on their footpads that function as high-performance dry adhesives, allowing them to effortlessly climb on diverse surfaces. The remarkable attachment ability is based on van der Waals and capillary forces and the principles of contact splitting and crack trapping. Synthetic mimics of these fibrillar adhesive systems have been actively developed in the past two decades with performance reaching and even surpassing that of geckos on smooth surfaces. Such fibrillar adhesive pads not only provide strong attachment to diverse surfaces but they are also superhydrophobic. Water repellency has been suggested to contribute to self-cleaning of the gecko footpads and their synthetic mimics through the lotus leaf effect, and it likely helps keeping the dry adhesion mechanism functional. Indeed, it has been found that wetting by water dramatically decreases the adhesion of gecko footpads to substrates. Similar reduction in performance has been reported for artificial bio-inspired adhesives underwater.

In the case of low surface tension liquids, such as oils, wetting becomes a major concern if the liquid spreads easily at the interface and between the fibrils. Even though carefully controlled, thin layers of viscous oil (0.1-2.1 µm thick) applied on the fibril tips of artificial dry adhesives can enhance adhesion on both smooth and rough surfaces, larger volumes of liquids (0.1-0.4 µl) at the solid-solid interface have been shown to drop adhesion to a fraction compared to dry conditions. For overall adhesion performance in various wetting conditions, it would be advantageous to displace (push away) liquid from the contact interface and make a dry contact. Preferably all liquids, regardless of their surface tension, should remain in the Cassie state (i.e. suspended on top of the fibrils), even during contact with the target surface. The transition barrier to the Wenzel state (i.e. fully wetting the substrate and fibrils) should also be sufficiently high to provide robust liquid repellency since the adhesion would drop drastically in the Wenzel state.

Combining high adhesion and liquid repellency on the same fibrillar surface is challenging as the two properties have fundamentally opposing requirements for solid fraction—it should be large for adhesion and small for liquid repellency. Furthermore, high liquid repellency has been traditionally achieved by a combination of surface chemistry and roughness modification, an approach which is incompatible with the goal of high adhesion. For example, sprayable coatings can be extremely effective at turning a surface super-repellent to all liquids but they rely on ultralow surface energy and hierarchical micro- and nanoscale roughness, which are both detrimental to dry adhesion.

Another prominent avenue for achieving repellency towards low surface tension liquids is based on arrays of microscale features with re-entrant geometry, inspired by the skin of springtails. In recent years, this approach has been taken further by the introduction of double re-entrant structures, which can repel all liquids regardless of surface chemistry. However, to date, the fabrication techniques only allow the use of rigid materials, which are not suitable for dry adhesives.

Bio-inspired elastomer fibrillar surfaces could have tremendous potential as reversible dry adhesives, but their performance is sensitive to the presence of liquids at the contact interface. Like their models in nature, many artificial mimics can effectively repel water, but fail when low surface tension liquids are introduced at the contact interface.

Thus, it is an object of the invention to provide a method for producing a fibrillar adhesive as well as a fibrillar adhesive material, which can repel liquids, especially liquids with low surface tension, and which can still adhere strongly at the contact interface.

This object is satisfied by the invention according to the subject matter of the independent claims.

In particular, a method of producing a liquid repellent fibrillar dry adhesive material having a plurality of fibrils is made available. The produced fibrils have a tip and a body and the tip has a larger outer dimension than the body. The method according to the invention comprises the following sequence of steps:

a) providing a negative mold having a surface and comprising cavities having a shape corresponding to an outer shape of the fibrils to be produced, wherein the mold is formed of a first material;
  b1) activating said surface and said cavities of said mold and then passivating the first material by providing a silane or another chemical treatment to the activated first material; or
  b2) providing a polymer coating to said surface and said cavities;
  c) applying vacuum to remove air out of the cavities;
  d) filling the cavities with a second material having a Young's modulus selected in the range of 10 kPa to 600 MPa;
  e) curing the second material to produce at least the fibrils optionally keeping some of the second material as a backing substrate to hold the fibrils together; and optionally
  f) demolding the first material from the second material to obtain said fibrils at said second material.

Thus steps c to f are carried out respectively after one of steps b1 and b2.

In other words, first a negative mold is provided, which comprises cavities having an inner shape which corresponds with the outer shape of the fibrils to be produced. Said shape is preferably mushroom shaped, in particular double re-entrant shaped, i. e. with an undercut remote from a top surface of the tip of the fibril.

That is, a double re-entrant shape comprises a mushroom like outer shape including a body, a tip and an undercut at the tip.

The top surface of the tip can be flat and smooth typically.

Furthermore, the tip can comprise an, in particular almost vertical, side wall with a given height and with a given sharpness and/or curvature at a tip edge that can be determined with the fabrication process resolution.

Said side wall can then comprise an at least substantially 90 degree or 90 degree turn and an undercut cavity under the tip surface.

The undercut area combines with the fibril tip at a neck area of the fibril body with a given curvature.

As mentioned above, such double re-entrant shapes have shown to achieve high repellency towards liquids regardless of the surface chemistry, which is one of the goals to be achieved by the invention. Conventionally, extreme liquid repellency is achieved by a combination of surface roughness and surface chemistry (i.e. low surface energy treatment). Double re-entrant fibrils are the only known method for making a surface liquid superrepellent regardless of the surface chemistry. Furthermore, adding double re-entrant edges to the fibrils also does not change the 2D shape of the top surface of the tip (looking from the top) or the smoothness of the top surface, which is crucial for the material to have high adhesion.

The body can be formed in several shapes, such as cubic, pyramidal, spherical, cylindrical, conic, cuboidal, triangular or hexagonal.

One method to prepare the mold for the further processing steps comprises the steps of activating the surface and the cavities of the mold and then passivating said surface and said cavities by providing a silane or other chemical treatment at the activated first material.

A common method for passivating a material may be the so-called fluorosilanization, where the surface of a material is covered with organofunctional alkoxysilane molecules. This helps to reduce the adherence of at least the surface and the cavities, i. e. to reduce the surface energy of the mold in order to be able to later remove the produced fibrils from the mold.

Another way to passivate the mold is to coat the surface and the cavities with an inert polymer, such as Parylene C, which can act as a non-stick coating.

In a next step vacuum is applied in order to remove air especially out of the cavities regardless of which method was chosen earlier to passivate the mold (surface and cavities). It has shown that when cavities with a double re-entrant shape are supposed to be filled with a (liquid) material, air can be trapped mostly in the edges of the undercut. Such a trapping of air would worsen the final result of the fibrils, i. e. alter the shape of the produced fibrils. Therefore, vacuum is applied to remove the air to later be able to fill the whole cavity with a second (liquid) material.

After applying the vacuum the cavities are filled with a second material having a Young's modulus selected in the range of 10 kPa to 600 MPa, i. e. with a comparatively soft material in comparison to the fibrils having complex structures known from the state of the art that are made from rigid material.

In this connection it is noted that a solid material experiences an elastic, hence a reversible, deformation when a small load is applied to it in compression or extension, i. e. stress or strain. At near-zero stress and strain, the stress-strain curve is linear and the relationship between the two can be described by Hooke's law. The coefficient of proportionality is called the Young's modulus.

The higher said Young's modulus is, the more stress is required to create the same amount of strain. An ideal rigid body would therefore have an infinite Young's modulus. On the contrary, an ideal soft material such as a fluid has a Young's Modulus of zero.

Hence, the Young's modulus enables the calculation of the change in the dimension of a bar made of an isotropic elastic material under tensile or compressive loads. For instance, it predicts how much a material extends under tension or shortens under compression.

The Young's modulus may not always be the same in all orientations of a material. The mechanical properties of isotropic materials such as most metals and ceramics, along with many other materials, are isotropic, i. e. are the same in all orientations. Thus, the Young's modulus of isotropic materials is the same in all directions. Anisotropic materials such as carbon fibers or wood, on the other hand, can comprise a different Young's modulus in different orientations.

In order to measure the Young's modulus of a material, tensile testing can be done with a commercial universal tensile testing machine such as an Instron tensile tester. Tensile testing, also known as tension testing, is a test, in which a material sample is subjected to a controlled tension until failure. The properties that are directly measured via a tensile test are ultimate tensile strength, breaking strength, maximum elongation and reduction in area. From these measurements—among other things—the Young's modulus can be determined.

The test process involves placing the test specimen in the tensile testing machine and slowly extending it until it fractures. During this process, the elongation of the gauge section is recorded against the applied force. The data can be manipulated such that it is no longer specific to the geometry of the test sample. The elongation measurement is used to calculate the engineering strain, ε, using the following equation:

$$\varepsilon = \Delta L/L_0 = (L-L_0)/L_0$$

wherein $\Delta L$ is the change in gauge length, $L_0$ is the initial gauge length, and L is the final length. The force measurement is used to calculate the engineering stress, σ, using the following equation:

$$\sigma = F_n/A$$

wherein F is the tensile force and A is the nominal cross-section of the specimen.

The Young's modulus can then be calculated via the following equation:

$$E = \sigma/\varepsilon.$$

As mentioned above, the applied vacuum will support in filling the cavities completely since the material can easily flow into the cavities, e. g. because of gravity, without being hindered by trapped air bubbles, which could keep the material from entering parts of the cavity. It is possible that the second material is the same material as the first material, i. e. the material of the negative mold, but it does not necessarily have to be. Another possibility would be that the first and the second material only comprise the same base material but are mixed in a different mixing ratio with a cross-linking agent. In a most preferred embodiment the first material, i. e. the mold material, has a Young's modulus, which is 2 to 10 times smaller than the one from the second material. That is to say that the negative mold is substantially softer than the produced fibrils. This can make the further step of demolding way easier, especially when the final replica comprises fibrils having the complex double re-entrant shape.

The second material is then fully cured, which can take about an hour, when the material is heated appropriately or even up to several days if the material is kept at a cooler environment. A common method is to heat the mold with the filled cavities in order to reduce the curing time. The exact curing time depends mostly on the chosen material as well as on the ambient temperature and can thus be chosen appropriately. Furthermore, the curing temperature can be chosen in accordance with the desired softness of the material since, for example, for elastomers higher curing temperatures lead to harder cured materials (i. e. higher Young's modulus) and vice versa. Thus, for soft materials often lower curing temperatures and longer curing times are chosen in order to end up with a material of the desired Young's modulus.

After curing the second material, the fibrils have basically already been produced. The only step left is to remove the mold from the produced replica of the fibrils. Since the material of the fibrils is a soft material, this can be done by using appropriate tweezers. With said tweezers the final replica of the fibrils can be grabbed and peeled off the mold manually. This is possible since the surface of the mold has been prepared such that it is non-sticky before (activating/passivating process) enabling the negative mold to be demolded from the replica without destroying the delicate structures of the re-entrant shaped fibrils.

According to a first embodiment of the invention the step of activating comprises either the provision of oxygen at the first material and then applying UV radiation at the oxygen atoms to produce ozone; or the provision of an oxygen plasma at the first material. Said process of activation leaves the surface hydroxyl (—OH) terminated and thus allows later, for example, fluorosilane to covalently bind to it during the step of passivating the material.

Because of the double re-entrant shape of the produced fibrils particular care has to be taken to coat the cavities such that every edge and corner, especially of the undercut, is reached in order to reach a continuous layer of coating that subsequently permits the separation of the fibrils from the negative mold. A similar effect to the provision of a coating of step b2 can be achieved by the activation and passivation carried out in step b1.

By providing method steps that activate and then passivate the surface topology of the negative mold, the whole surface of the negative mold and the cavities present therein can be made non-sticky independently of the shape of the cavities.

In this connection a non-sticky coating means that the fibrils are separated from the negative mold by a layer of inert molecules in such a way that the fibrils once cured can be separated from the negative mold without remaining attached thereto and without damaging the fibrils.

According to another embodiment the method further comprises the steps of:
  a) producing a master having a surface and comprising patterns of the plurality of fibrils, for example, by using an additive manufacturing technique, such as two-photon lithography or 3D printing;
  b1) activating said surface and said patterns of said master and then passivating the master material by providing a silane or other chemical treatment to the activated master material;
  b2) coating said surface and said patterns with a polymer coating;
  c) covering the prepared patterns of the plurality of fibrils with the first material;
  d) curing the first material;
  e) removing the master to produce the negative mold.

Thus steps c to e are carried out respectively after one of steps b1 and b2.

Thus, it can be seen that the negative mold can be produced in a similar way as the fibrils by using a "negative" model of the fibrils, which in this case would be the master. The master comprises the patterns of the fibrils to be produced (thus enabling the formation of the "negative shapes" of the cavities of the negative mold).

The surface of the master can then either be activated and passivated or coated with a polymer coating in order to prepare the surface for the next steps of the production, i. e. the covering of the patterns with a first material, which may be a soft material, in particular the same material as the second soft material used to produce the fibrils. Thus, it can be preferred to produce the negative mold of a soft material as well in order to be able to handle the delicate fibrils better.

In this connection it should be noted that also the patterns can be coated with a "non-sticky coating" as mentioned in the foregoing in order to be able to separate the patterns of fibrils from the negative mold by a layer of inert molecules in such a way that the negative mold once cured can be separated from the patterns without remaining attached thereto and without damaging the negative mold.

Since the fibrils to be produced can comprise a rather complicated shape, additive manufacturing techniques such as 3D printing are needed to produce the master, and especially the patterns on the master, with high accuracy. It may also be possible to produce the master with conventional microfabrication techniques or even with a bottom-up self assembly process.

It is preferred that the step of preparing the patterns of the plurality of fibrils comprises either the provision of oxygen at the master material and then applying UV radiation at the oxygen atoms to produce ozone; or the provision of an oxygen plasma at the master material. As already mentioned above, this can be done as a first step in order to provide a, so to say, non-sticky coating, to the surface of the master, even on the surface of the undercuts of the patterns.

According to another embodiment at least one of the first material and the second material has a Young's modulus selected in the range of 10 kPA to 5000 MPa, in particular in the range of 10 kPa to 600 MPa, especially in the range of 10 kPa to 50 MPa, preferably in the range of 100 kPA to 15 MPa, in particular in the range of 100 kPA to 5 MPa. Thus, it may be possible that the first and the second material are both soft materials. It has shown that such a choice of soft materials of both the first and the second material can be advantageous when double re-entrant shaped fibrils of a soft material are supposed to be produced. Preferred materials can be polymers, such as elastomers (PDMS or polyurethane). On the other hand, it could also be possible that, for example, the mold is produced from a rigid material by using commonly known fabrication techniques, which may be easier and cheaper.

According to another aspect of the invention a fibrillar dry adhesive material is provided, which is in particular made and/or obtainable by a method according to the invention. The fibrillar dry adhesive material comprises a plurality of fibrils, each fibril having a double re-entrant fibril tip geometry. Furthermore, each fibril is made of a soft material, wherein the soft material has a Young's modulus selected in the range of 10 kPa to 5000 MPa. Thus, double re-entrant shaped fibrils are given, which are made of a soft material. This way, the fibrils are fully soft and the material comprises a liquid super-repellent surface, which is mechanically not brittle, highly robust against physical contact, highly deformable, flexible and stretchable. State-of-the-art liquid super-repellent surfaces made of rigid materials are very susceptible to mechanical damage/contact. Some recent studies use flexible backing and rigid microstructures to make them bendable, but the structures themselves are still highly vulnerable to mechanical contact and damage. By being entirely soft, the elastomeric structures according to the invention address a fundamental, long-standing challenge for liquid super-repellent surfaces, which is the lack of mechanical durability.

In view of the foregoing a novel approach is proposed for strong adhesion to dry and wet surfaces. Microfibrillar adhesive films are made available that are composed of elastomeric microfibers decorated with tips terminating in a re-entrant geometry. Such fibril shape allows simultaneously strong dry adhesion and extreme liquid repellency. Specifically, the surface enables dry adhesion in the presence of liquids, including oils and other low surface tension liquids. Additionally, the same microfibrillar adhesive presents a fully soft, flexible, stretchable, bendable, twistable and durable liquid superrrepellent surface. The advantages described in connection with liquid repellency likewise hold true for the adhesive properties.

In this connection it should be noted that the double re-entrant geometry of the tip of the fibrils avoids the liquids from flowing down the fibrils and coming into contact with the base of the fibrils which would prevent these from adhering to the surface to which they should attach. This is because the fibrils would no longer establish intimate contact with the surface as liquid would infiltrate the space between the tips and the surface, where even a single monolayer of liquid interferes with the short-range intermolecular attractive forces between the fibrils and the surface.

According to an embodiment of the invention the material further comprises a backing substrate on which the fibrils are arranged. The backing substrate can either be made of the same material as the fibrils or a different material. Furthermore, the backing substrate additionally can be connected to a payload. The main purpose of the packing substrate is to hold several fibrils together, in particular arranged in arrays, in order to produce a material of the above described properties.

According to another embodiment the soft material has a Young's modulus selected in the range of 100 kPA to 50 MPa, especially in the range of 100 kPa to 15 MPa, preferably in the range of 100 kPA to 5 MPa.

It is preferred that the soft material is selected from the group of members consisting of organic, inorganic, polymers, rubbers, biomaterials, composites, foams, fabric materials, particle materials, fibrous materials, or combinations of the foregoing. In this connection it is noted that the soft material is preferably an elastomer, such as PDMS or a polyurethane elastomer.

It is another embodiment of the invention that the fibrils comprise a fibril body and a tip extending over edges of the fibril body that terminate with the re-entrant geometry, wherein a top part of the tip comprises a flat, convex, concave, wavy, undulating, zig-zag, smooth or rough geometry. Therefore, the fibrils can be formed mushroom shaped and the most preferred double re-entrant geometry of the tip of the fibril can comprise more than one bend downward and then toward the fibril body away from the top surface of the tip of the fibril.

According to another embodiment the tip is an integral part of the fibril body or wherein the tip is added separately to the fibril body. In the case of a separate adding of the fibril tip to the body it is noted that the tip can be connected to the body by inking or gluing them together. Thus, for the example of gluing, the tip can be dipped into a third material, e. g. an uncured elastomer, polymer or adhesive, and then placed on the body. In a further step, the third material would have to cure in order to permanently hold the tip and the body together. During the inking process, the third material itself typically forms the tip. After dipping the body, the tip shape is determined by whatever the inked body is pressed against (usually a flat, smooth surface) and the dynamics of "pressing". For example, if the body is already a mushroom-like "T-shape", then inking and pressing (using suitable force and speed) against a flat surface might make the ink material spread slightly over the edges of the T to form a second undercut, or double re-entrant geometry. Alternatively the tip and the body are produced together out of the same material such that they form one integral fibril.

According to a different embodiment the ratio of the diameter of the tip to the diameter of the body lies in the range of 1 to 100, preferably in the range of 1 to 50, most preferably in the range of 1 to 10, especially in the range of 1 to 5. Thus, the fibril body is notably thinner than the fibril tip.

In this connection it is noted that a typical value for the diameter of the tip lies within a range of 10 nm to 1 mm, preferably 0.1 µm to 100 µm. Typical values for the width and length of the re-entrant parts of the tip, on the other hand, lie within a range of 1 nm to 1 mm, preferably 10 nm and 100 µm.

It is preferred that a density distribution of the plurality of fibrils, preferably on the backing substrate, is defined by a ratio of a surface area of voids present between the individual fibrils to a surface area of the fibrils, with the ratio lying in the range of 0.01:100 to 100:0.01, preferably in the range of 1:100 to 100:1. It has been found that when less voids per surface area are present, the better the adhesion gets. This, obviously, only holds down to a certain limit. A flat surface with no voids, for example, would worsen the adhesion since the actual/effective contact area would in practice be smaller with most real-world surfaces, due to worse conformation. When more voids are present, on the other hand, the liquid repellency is improved. Thus, an appropriate ratio has to be chosen in order to achieve both a good adhesion as well as a good liquid repellency.

According to another embodiment of the invention the fibrils are arranged in regular or irregular arrays, in particular on the backing substrate. Forming regularly spaced arrays means that the ratio of the surface area of the voids to the surface area of the fibrils can be predefined in a simple manner. If, on the other hand, irregularly shaped arrays are selected, then the backing substrate can, for example, be used to connect the regions where a non-uniform distribution of the arrays may be beneficial. Thus, the arrangement of the fibrils can be chosen according to the application of the material.

It is another embodiment of the invention that the fibrils and the backing substrate are formed integrally or wherein the fibrils and the backing substrate are formed separately and are connected to one another. Thus, the backing substrate and the fibrils may either be formed of the same material or of different materials. It can be chosen according to the application of the material which embodiment is preferred. In the case of independent fibrils and backing substrates the same gluing/inking techniques as explained in connection with the fibril tips and bodies can be chosen to connect the two parts.

It is also possible that the backing substrate is a material selected from the group of members consisting of organic, inorganic, metals, alloys, ceramics, glass, polymers, rubbers, biomaterials, composites, foams, fabric materials, particle materials, fibrous materials, hydrogels and combinations of the aforementioned. In this connection it is noted that the backing substrate can also be made out of one of the above mentioned materials and then coated with an additional layer. Said layer may again be a material selected from the group of members consisting of the above mentioned examples. The thickness of said layer may lie within a range of 1 nm to 1 mm.

According to another embodiment of the invention a width and a breadth of the backing substrate are equal to or bigger than 10 µm and a thickness of the backing substrate lies in the range of 0.01 µm to 1 cm. Thus, there is basically no upper limit for the width and the breadth of the backing substrate, meaning that it can also be possible to produce sheets of fibrillar dry adhesive material, which eventually can later be placed on a payload. Said payload would make the overall thickness of the substrate substantially bigger, which has no impact on the adhesion and liquid repellency properties of the fibrils.

It is preferred that the fibrils and/or the backing substrate further comprise a filler material selected from the group of members consisting of organics, inorganics, metals, alloys, ceramics, glass, polymers, rubbers, biomaterials, hydrogels, liquid materials, phase changing materials, composites, foams, fabric materials, particle materials, fibrous materials, micro- and nanoparticles and combinations of the foregoing. An example for the use of filler materials could be magnetic micro-particles, which enable the material to be movable, or metal particles, which can make the material switchable or electrically conductive so that it could e.g. be used as part of a sensor. It could also be possible to introduce a type of functionalized material in order to give the backing substrate, for example, a further function apart from holding the fibrils together.

It is another aspect of the invention to use the fibrillar dry adhesive material according to invention, in particular made and/or obtainable by a method according invention, for wearable devices, electronics, apparel, apparel closures, robotics, automotive coatings, portable electronics or other devices, space technology, manufacturing technologies with oily contact interfaces, liquid repellant devices, liquid repellants in devices, food packaging, surgical tools and other medical devices, underwater marine vessels and manipulation of liquid droplets including picking droplets, pinning droplets, releasing droplets and transporting droplets. Thus, it can be seen that the liquid repellent fibrillar dry adhesive material can be used in several different applications, meaning that it can have a tremendous potential.

Figure 4:
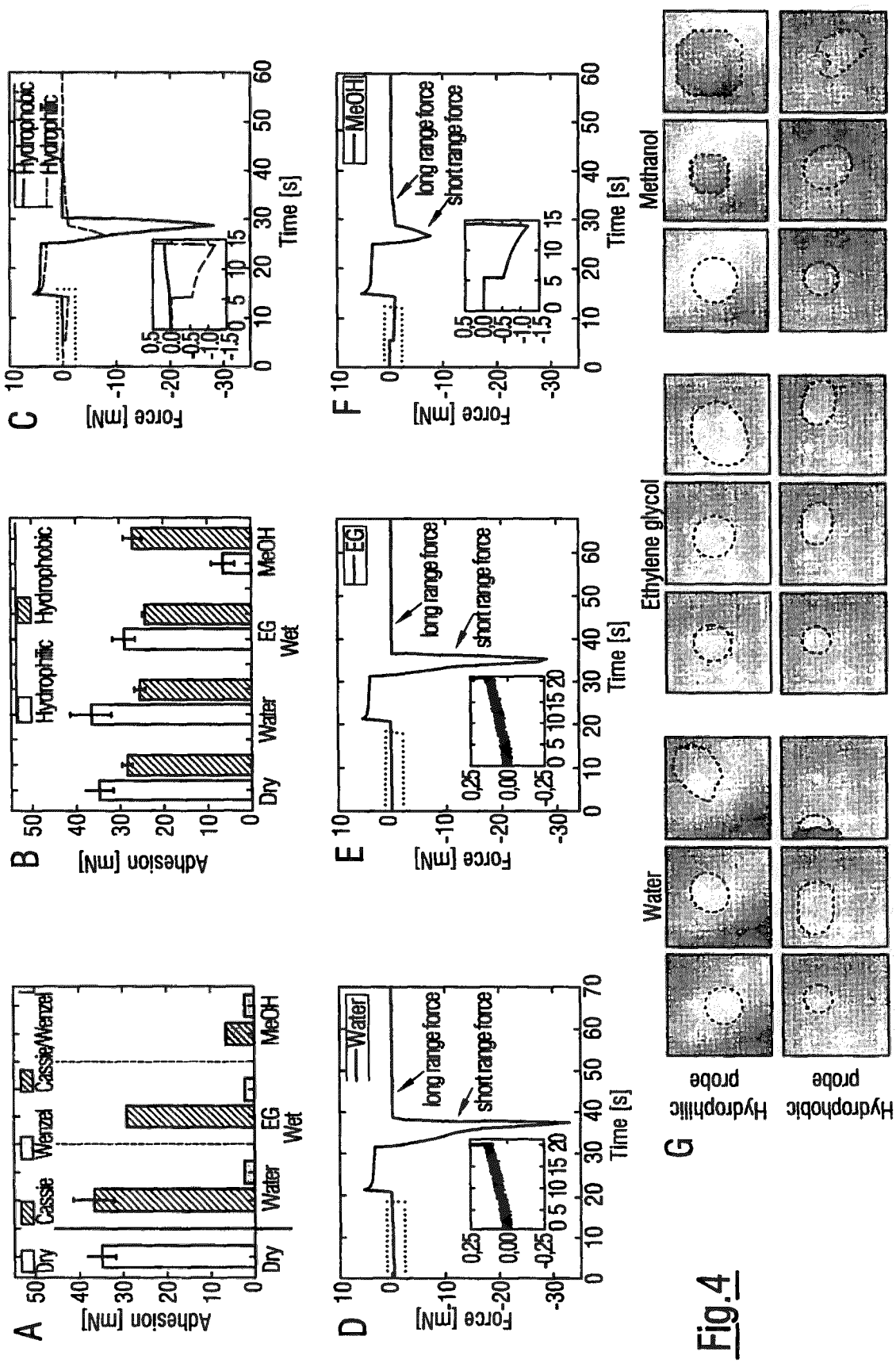
Figure 5:
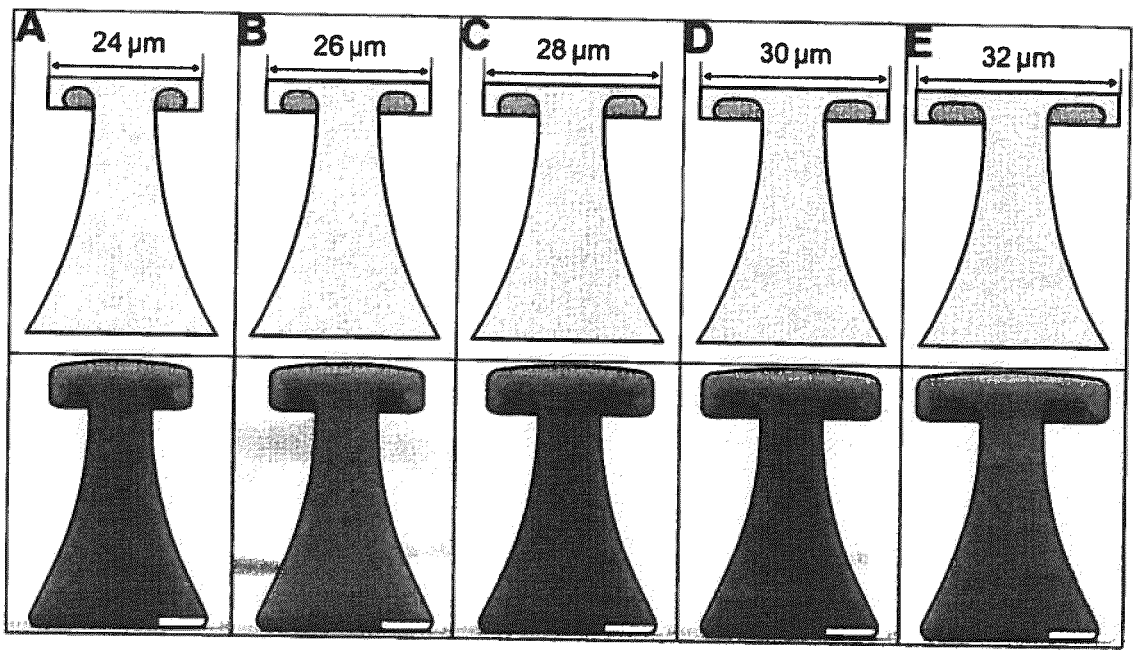
Figure 6:
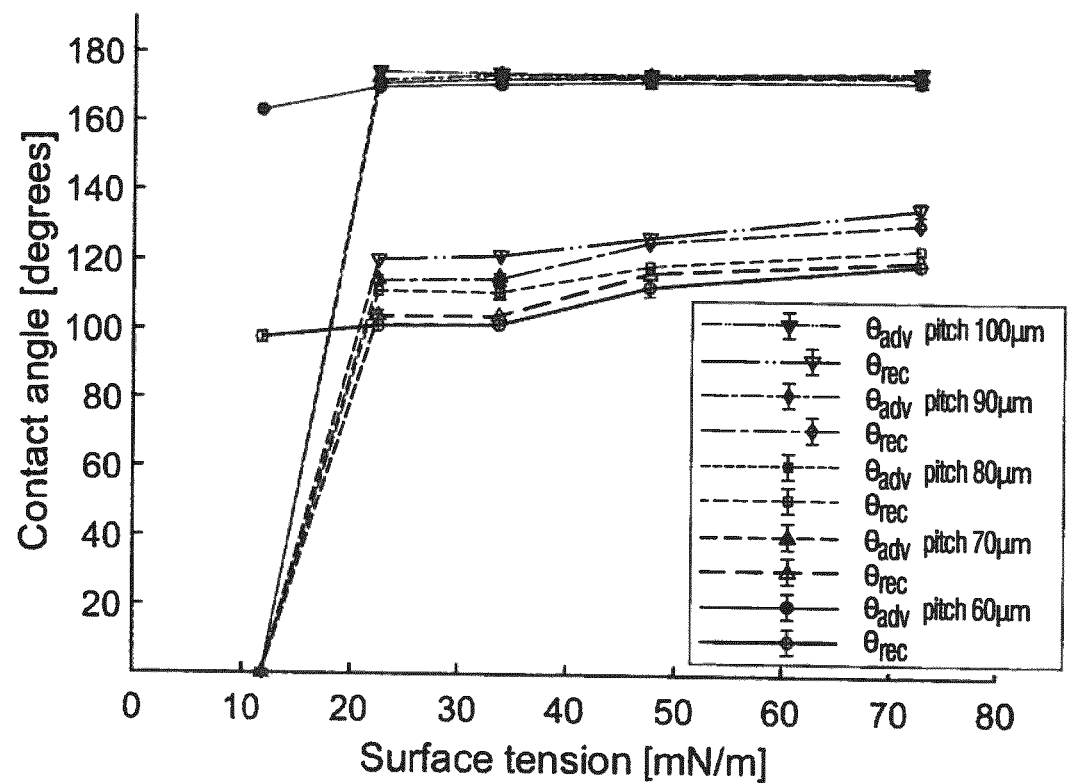
Figure 7:
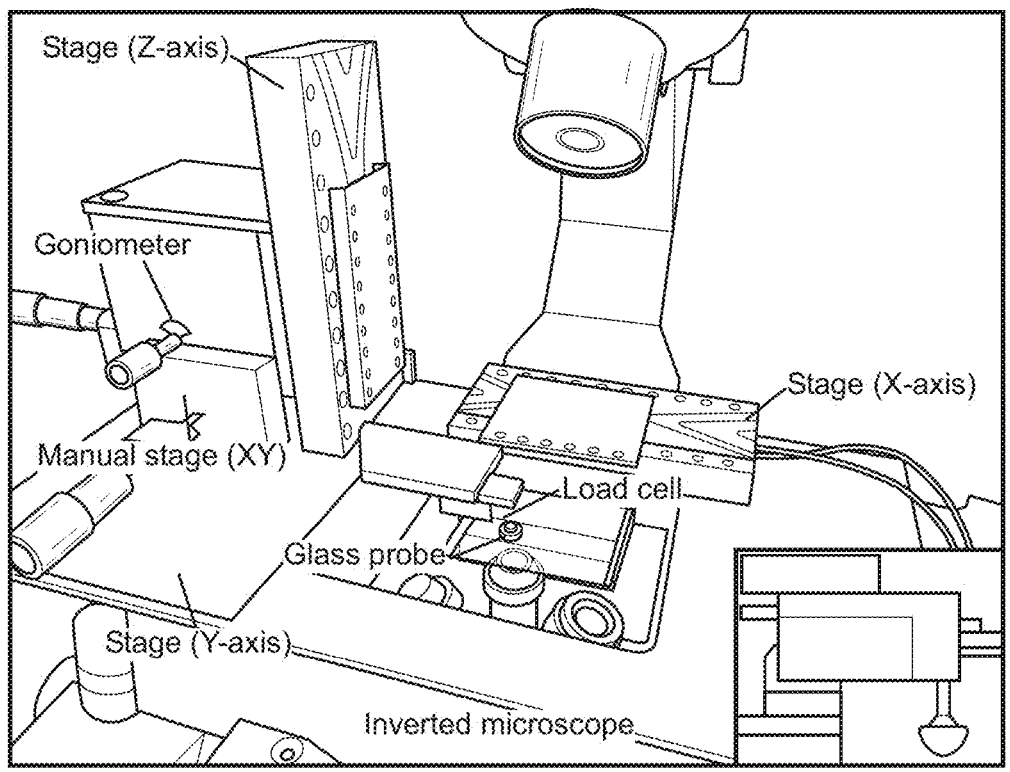
Figure 8:
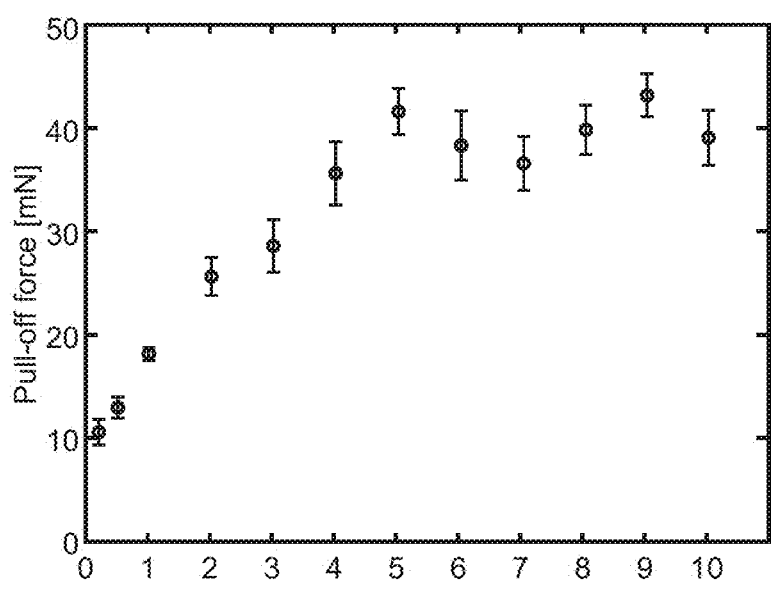
Figure 9:
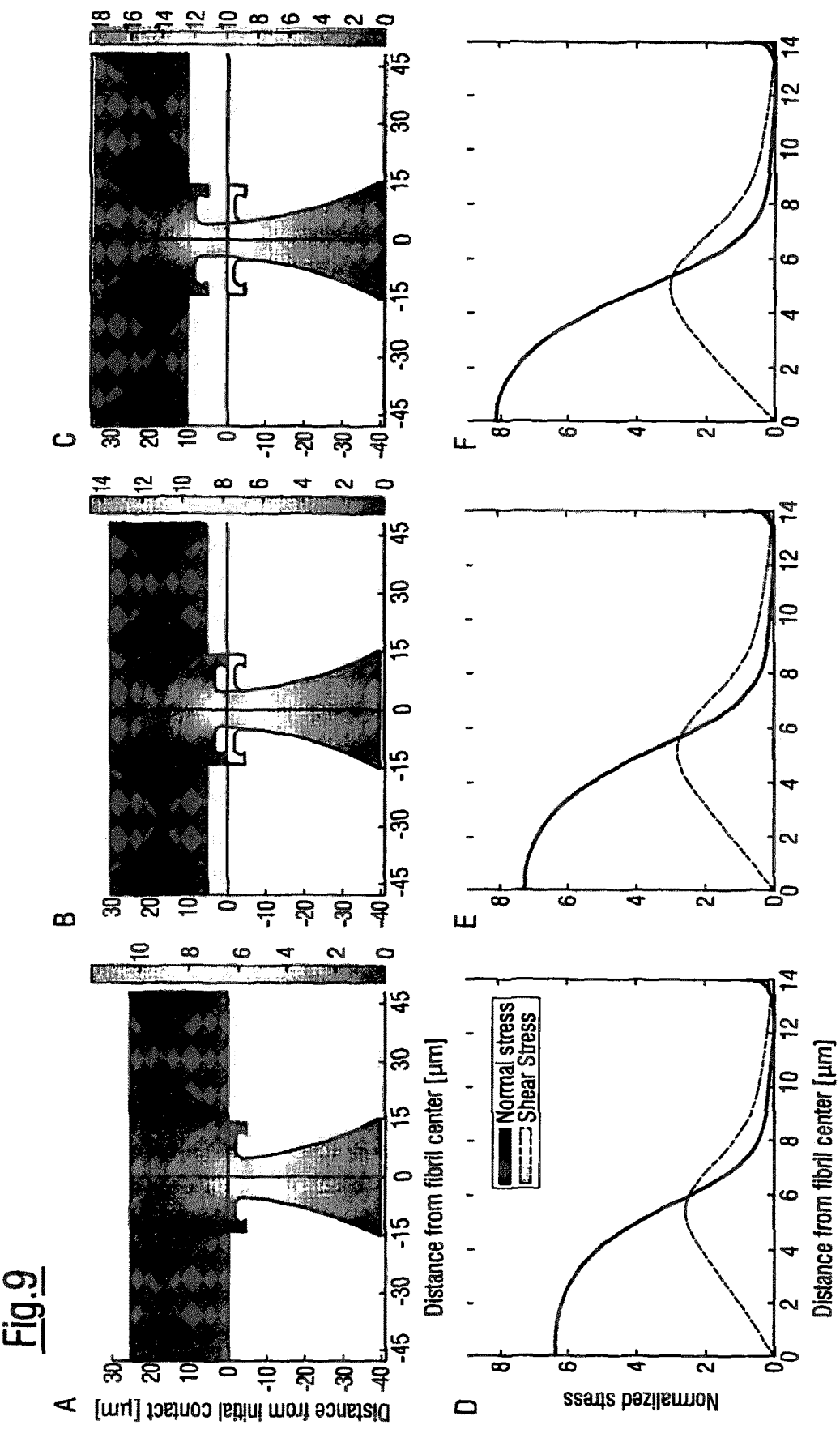

Further embodiments of the invention are described in the following description of the Figures. The invention will be explained in the following in detail by means of embodiments and with reference to the drawings in which is shown:

FIGS. 1A to E: The fabrication steps of soft elastomeric double re-entrant fibril arrays according to the invention;

FIGS. 2A to D: an illustration of the liquid repellency of double re-entrant PDMS microfibrils:

FIGS. 3A to D: an illustration of the adhesion of double re-entrant PDMS fibrils;

FIGS. 4A to F: results of the adhesion of double re-entrant PDMS fibrils with different liquids at the contact interface;

FIG. 4G: liquid displacement ability of the fibrillar adhesive during contact depending on hydrophilicity/hydrophobicity of the contacting surface;

FIGS. 5A to E: different fibril cap diameters for adhesion studies;

FIG. 6: the fibrillar adhesive wettability dependency on pitch;

FIG. 7: a measurement setup;

FIG. 8: results for the adhesion dependency on a preload;

FIG. 9: results of FE simulations of PDMS fibrils under tensile load; and

Figure 10:
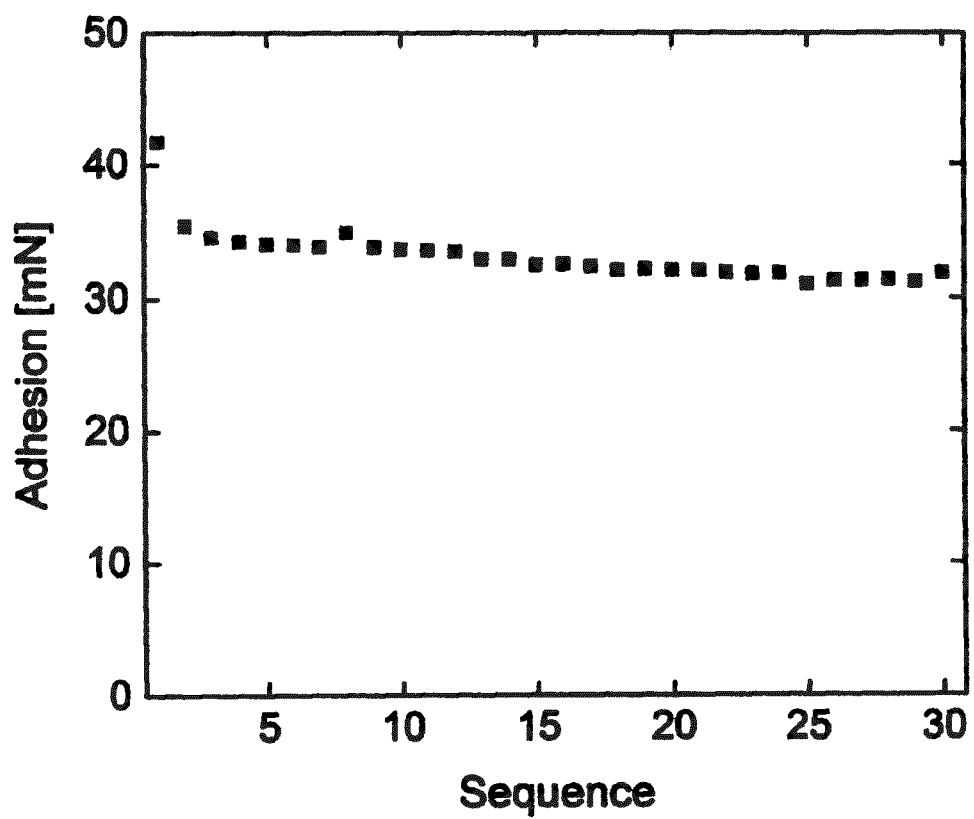

FIG. 10: the adhesion over repeated cycles.

FIG. 1A shows schematically the different steps of the method according to the invention beginning with the production of a master 10. In a first step the rigid master is 3D-printed using two-photon lithography such that the master comprises patterns 12 of a plurality of fibrils, which are supposed to be produced, i. e. the patterns 12 of the plurality of fibrils comprise the same outer shape as the produced fibrils 8 at the end of the manufacturing process, i.e. a double re-entrant shape. Said shape will be explained in detail in connection with FIGS. 1B to E. For the production of the master 10 commonly known (rigid) materials, which can be used for additive manufacturing techniques, can be chosen.

In a second step the master 10 including its patterns 12 are first covered with a non-stick coating (not shown) and then with a first soft material 14. Thus the patterns 12 are replicated with the first soft material 14 in order to produce a negative mold 16 comprising cavities 18 with an inner shape corresponding to the outer shape of the patterns 12, i. e. the double re-entrant shape of the fibrils to be produced. The first soft material 14 usually comprises a Young's modulus in the range of 10 kPa to 5 MPa. Also higher values are possible as long as they still lie within a range where the material can be regarded as "soft".

The "non-stick coating" is supposed to reduce the surface energy of the cavities 18 in order to simplify the further step of demolding the master 10 from the first soft material 14 (the mold 16). In commonly known methods for manufacturing double re-entrant shapes out of rigid materials a non-stick coating is not necessary since they can be produced with additive manufacturing processes. Here it is the case that a double re-entrant shape is supposed to be produced out of soft materials, which is why a negative mold 16 is needed. Therefore, in a first embodiment of the invention, the surface of the master is first activated by providing oxygen molecules to the master. Said oxygen molecules are then illuminated with UV radiation which causes the oxygen to react with, for example, the carbon dioxide in the air to produce ozone. These ozone molecules are able to reach every edge and corner of the patterns to react and activate the surface. In a further step, passivation is initiated by providing a silane, preferably fluorosilane, or another chemical treatment to the activated surface, which can react with the activated surface in order to give it a sensation of a "non-sticky coating", i. e. to help in a further step of demolding the master from the first material.

Another possibility would be to provide an oxygen plasma to the master surface to activate the surface before passivating it with fluorosilane or another chemical treatment.

In another embodiment of the invention, the surface and the patterns of the master are simply covered with a polymer coating. When using this method a provision of UV radiation is not necessary.

In a further step, regardless of which "coating"-method has been chosen, before the master 10 is demolded, the first soft material 14 is cured since the material 14 is usually in a liquid phase when it is applied to the master 10. Depending on the exact material used for the first soft material 14 and depending on the ambient temperature said curing can be done within 10 minutes, when the temperature is raised to 150° C., within an hour, when the temperature is raised up to 90° C., or can even take up to 48 hours when the temperature is kept at room temperature (example of PDMS with a standard 10:1 monomer to crosslinker ratio). For softer formulations like, for example, a 20:1 ratio room temperature curing takes even longer.

In order to demold the master 10, without destroying it, from the first material 14 it can be mechanically peeled off by using conventional tweezers. Since the surface of the master 10 has been prepared with the activation and passivation steps or with the polymer coating, as described before, it can be peeled off rather easily from the first material 14 without destroying the delicate structures of the cavities 18 or the patterns 12. Other demolding techniques like chemical dissolving may generally be possible depending on the used materials but are nevertheless infeasible since they would destroy the master and make it not reusable.

After the mold 16 is completely separated from the master (which is only possible because of the previous "coating"-steps), first the surface of the mold 16, and especially the cavities 18, are coated by using one of the coating techniques described above (activating/passivating or polymer coating). Then, vacuum is applied to the cavities 18 in order to remove air (not shown) from the cavities 18. This will help in the next step where the cavities 18 are filled with a second soft material 20. The second soft material 20 can be the same material as the first soft material 14. In general it is also possible to use different materials, but it has been shown that soft materials for both the first and the second material 14, 20 are preferred since they guarantee the production of the delicate fibril structures. In the depicted case of FIG. 1A, for example, the first and second soft materials 14 and 20 comprise the same base material (PDMS) but comprise different ratios of base material to cross linker material (20:1 for the first material 14 versus 10:1 for the second material 20).

In order to fill the cavities 18 completely, it might be necessary to tilt the negative mold 16 to a certain degree in order to let the second material 20 flow into the cavities 18, especially also in the undercut parts 24 of the cavities 18 (see e. g. FIG. 1B). Usually, as the second material 20 enters the cavities 18, from which the air has been removed, gravity and hydrostatic pressure will ensure that the cavity 18 is filled completely with the second material 20 even if the mold 16 is not tilted that much or not tilted at all.

One possibility would also be to provide the second material 20 at the mold 16 without the second material initially coming into contact with the cavities 18, before applying the vacuum to the mold 16. Then, after the vacuum has been applied, the mold 16 is moved, in particular tilted, relative to the second material such that the second material 20 flows into and completely fills the degassed cavities 18 to form the fibrils within the cavities 18.

In this connection it is noted that it is either possible to only fill the cavities 18 with the second soft material 20 or to cover the whole mold 16 with the material 20 in order to also produce a backing substrate 22, which is supposed to hold the array of fibrils 8 together. Most common techniques use the latter and additionally provide a backing substrate 22. Said backing substrate 22 can have a thickness of about 0.5 to 1 mm or even up to 10 cm. For certain applications it is also possible to attach the backing substrate 22 to a payload (not shown) which is generally not limited in size and dimensions.

The next step comprises curing the second soft material 20 to finally produce the fibrils 8. Optionally some of the cured second material 20 can be kept in order to provide said backing substrate 22. In some embodiments it is also possible to remove the parts of the cured backing substrate 22 with a razor blade or the like (not shown) in order to only keep the fibrils 8 at the end. Furthermore, it could also be possible to first add the backing substrate 22 and then add a third material, which could act as a "new" backing substrate.

Lastly the first soft material 14 is demolded from the second soft material 20 to only end up with the produced fibrils 8 (and optionally the backing substrate 22).

Thus, in summary, for the elastomeric fibrillar surface fabrication (FIG. 1A), first a two-photon polymerization method was used to 3D-print the master 10 fibril array (patterns 12) on a glass substrate. The master 10 was then fluorosilanized to allow subsequent demolding, and PDMS (first soft material 14) was then cast and cured on the fibril array 12. The negative replica (negative mold 16) was peeled off and fluorosilanized and the subsequent molding 16 yielded a PDMS replica of the original master 10. A softer PDMS composition (20:1 monomer to crosslinker ratio) for the negative replica was employed to facilitate demolding of the final replica, for which standard PDMS (second soft material 20) was used (10:1 monomer to crosslinker ratio). The final replicas were characterized as prepared without any further processing.

The fibrils 8, which could be produced with the above disclosed method are shown in FIG. 1B to 1E. One can immediately see that the fibrils 8 are of a double re-entrant shape, where each fibril 8 comprises a fibril body 26 and a fibril tip 28. That is, the double re-entrant shape comprises a mushroom like outer shape including a body 26, a tip 28 and an undercut 24 at the tip.

The top surface of the tip 28 can be flat and smooth typically. Furthermore, the tip 28 can comprise an, in particular almost vertical, side wall with a given height and with a given sharpness and/or curvature at a tip edge that can be determined with the fabrication process resolution.

Said side wall can then comprise an almost 90 degree turn and an undercut cavity 24 under the tip surface. The undercut area 24 combines with the fibril tip 28 at the neck area of the fibril body 26 with a given curvature.

The fibril 8 dimensions (FIG. 1B) of the fibrils 8 shown in the FIGS. 1C to 1E were fixed as base diameter B=30 μm, height H=40 μm, neck diameter d=10 μm, overhang height h=5 μm and overhang thickness t=3 μm. The tip diameter D was varied for the adhesion studies explained later in connection with FIG. 5. The overhang dimensions could easily be reproduced in 3D-printing (FIG. 1C) and were set large enough to facilitate replication in PDMS (FIG. 1D). Fibril pitch for the replicated arrays (FIG. 1E) was chosen as 60 μm to maximize their liquid repellency (FIG. 6).

Figure 2:
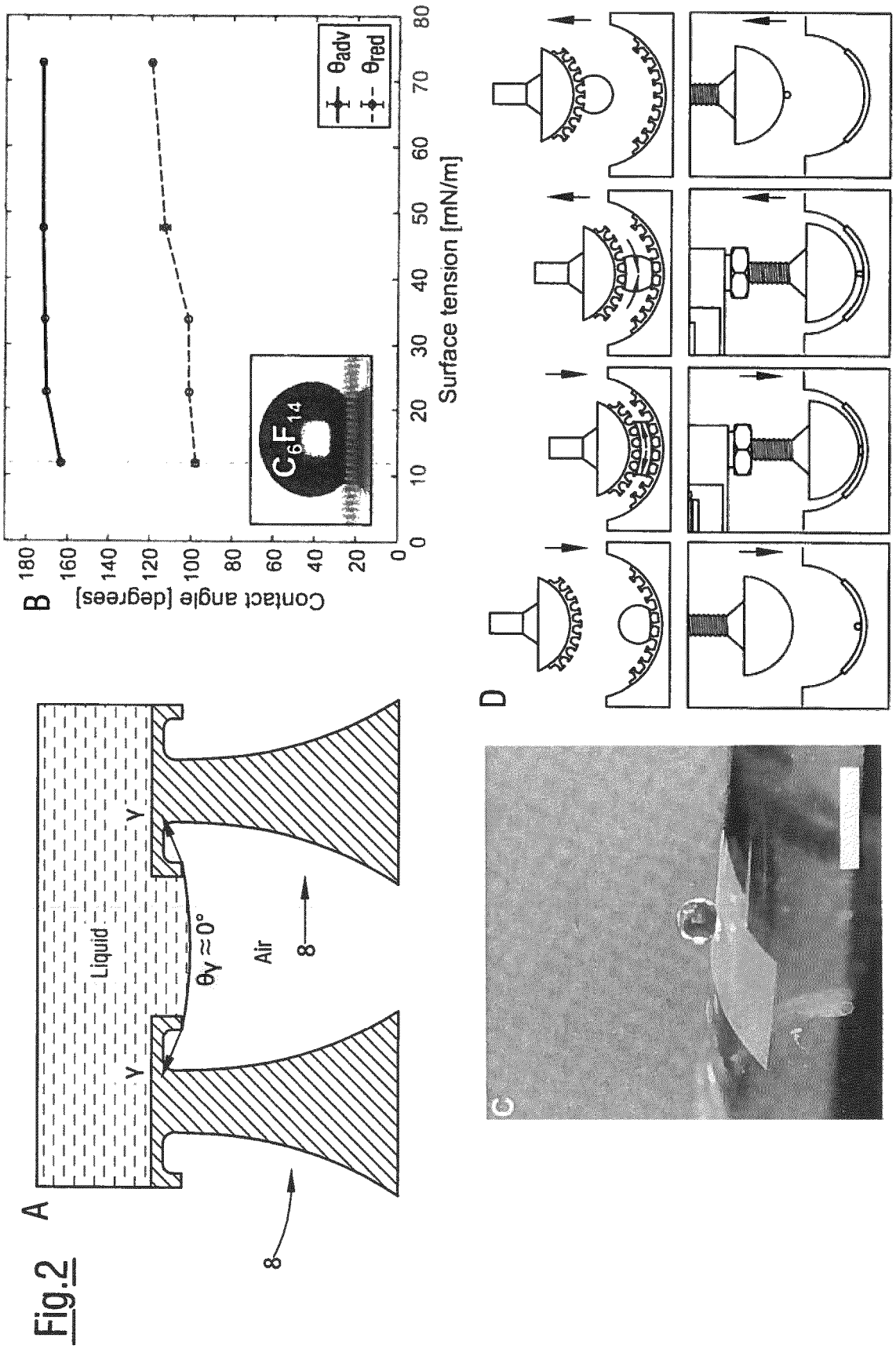

FIGS. 2A to 2D show the liquid repellency of the fibrils 8 produced with the method according to the invention. In FIG. 2A one can see a liquid on top of the fibrils supported by vertical components of surface tension. FIG. 2B shows the advancing (blue) and receding (red) contact angles of perfluorohexane ($\gamma$=11.91 mN/m), methanol ($\gamma$=22.7 mN/m), dipropylene glycol ($\gamma$=33.90 mN/m), ethylene glycol ($\gamma$=47.7 mN/m) and water ($\gamma$=72.8 mN/m) on the PDMS fibril array. The inset shows a droplet of perfluorohexane in the Cassie state on the PDMS fibril array (scale bar: 200 μm). FIG. 2C shows a droplet of methanol on a bent PDMS fibril array (scale bar: 2 mm) and FIG. 2D shows a schematic and corresponding real experiment snapshots of picking up a droplet of methanol from a concave fluorosilanized PDMS double re-entrant fibril 8 surface (bottom) using an identical non-silanized convex surface (top), facilitated by the difference in surface energies.

To achieve reliable liquid repellency, particularly for ultralow surface tension liquids, the fibril 8 tip diameter D and center-to-center distance in the array were chosen in a way that favors robustness of the Cassie state rather than simply maximizing advancing and receding contact angles by decreasing the solid fraction (the fraction of the solid surface in contact with liquid). In practice this meant inclining towards a larger fibril tip diameter D and smaller center-to-center distance. This tradeoff is reasonable because the increased contact area also leads to higher dry adhesion. It was found that for fibrils 8 with a tip diameter D of 28 µm, reducing the center-to-center distance to 60 µm was required for keeping all the tested liquids in the Cassie state, suspended by the vertical components of surface tension (FIG. 2A). Liquid repellency of the double re-entrant PDMS fibrils was characterized using contact angle measurements. Advancing and receding contact angles were determined for a variety of liquids covering surface tensions in the range of 11.91-72.80 mN/m (FIG. 2B). Perfluorohexane was included in the test liquids as a representative fluorinated organic solvent, which typically wets most surfaces completely due to its ultralow surface tension (11.91 mN/m). Even perfluorohexane remained in the Cassie state on the double re-entrant soft fibril array (FIG. 2B, inset). Due to the high robustness of the Cassie state, the elastic surface could be bent to a curve and still repelled low surface tension liquids, such as methanol (FIG. 2C), even allowing droplet pick-and-place manipulation of various liquids including methanol (FIG. 2D).

Figure 3:
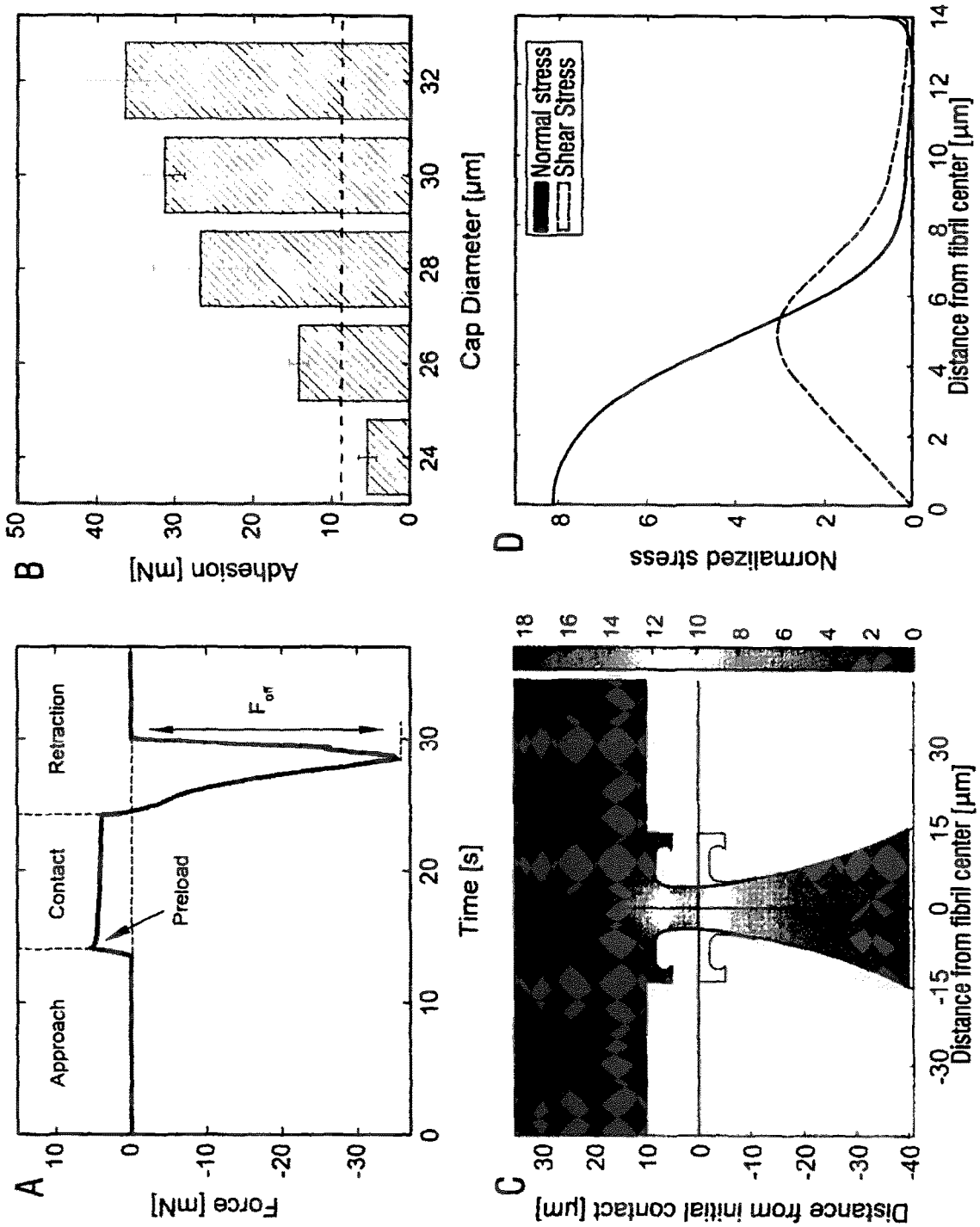

FIGS. 3A to 3D show the adhesion of double re-entrant PDMS fibrils 8, wherein in FIG. 3A one can see a representative force curve of a dry adhesion measurement. FIG. 3B shows the pull-off forces for the double re-entrant PDMS fibril 8 arrays as a function of fibril tip diameter D for a 2 mN preload force. FIGS. 3C and D show FE simulations of (C) the normal stress distribution of a single fibril when stretched 25%—normalized to stress at the base—and (D) the corresponding stress profile at the contact interface. Such relatively equal stress distribution is required for maximum adhesion.

Adhesion of the fabricated fibrillar surfaces was characterized with pull-off force measurements (FIG. 3A) using a smooth hemispherical glass probe (radius of curvature: 4 mm) as the contacting surface at a speed of 25 µm/s (FIG. 7). Pull-off forces increased with increasing tip diameter D, when all other fibril 8 dimensions were fixed (FIG. 3B), reaching values up to five times higher than a flat control surface for the largest diameter (32 µm) with a preload force of 2 mN. Considering the projected contact area at the moment of maximum pull-off force, adhesion stress surpassed 100 kPa for the tip diameter 28 µm and larger. The well-known dependence of adhesion on the preload force was also observed (FIG. 8). Finite element (FE) simulations showed that the stress in the fibrils 8 is concentrated around the fibril tip center and neck (FIG. 3C), while the double re-entrant overhang remains almost free of stress (FIG. 3D). The FE simulations (FIG. 9) and our experiments confirm that adding a double re-entrant overhang to the fibrils 8 does not interfere with their adhesion performance with the selected fibril material and geometries, but may actually help preventing cracks initiated near the fibril edges from propagating and leading to adhesion failure, which is consistent with recent modelling of the T-shaped fibrils.

FIGS. 4A to F show the adhesion of double re-entrant PDMS fibrils 8 with different liquids at the contact interface. In FIG. 4A one can see the adhesion with 5 µl of water, ethylene glycol or methanol compared to dry adhesion. FIG. 4B shows the effect of contact surface hydrophilicity/hydrophobicity on adhesion with methanol at the contact interface and FIG. 4C shows representative force curves of both cases. FIGS. 4D to F show representative force curves for water, ethylene glycol and methanol at the contact interface when using a hydrophilic probe, and corresponding snapshots of real experiments showing the wetting state with added dashed lines for clarity (yellow: dry contact, blue: Cassie state, red: Wenzel state; scale bars: 1 mm). The insets of FIGS. 4D and E show a positive force as the droplet Laplace pressure is positive, while the inset of FIG. 4F shows a negative force as the liquid collapses to the Wenzel state.

To investigate the advantages of liquid superrepellency for bioinspired dry adhesives in realistic wetting conditions, the adhesion of the double re-entrant fibrils 8 with 5 µl droplets of different test liquids (water, ethylene glycol and methanol) at the contact interface to adhesion in dry condition was compared. The results show that keeping liquid in the Cassie state enables direct dry contact between the fibril and the contact surface so that short-range van der Waals forces dominate and dry adhesion performance is almost completely retained. On the other hand, collapsing to the Wenzel state greatly reduced short-range forces and the remaining weak long-range capillary forces resulted in significantly reduced adhesion (FIG. 4A). It is noted that if liquid was fully pushed away from the contact interface (e.g. in the case for water), the adhesion was similar to the dry case. If the liquid was partially pushed away (e.g. in the case for ethylene glycol) the adhesion was slightly reduced. Finally, if the liquid was not pushed away at all (e.g. in the case for methanol) and collapsed to the Wenzel state and the adhesion was significantly reduced. For low surface tension liquids, such as methanol, a hydrophobic contacting surface (static contact angle 103.7°) enables partially displacing it, thus preventing a collapse to the Wenzel state and therefore retaining the adhesion performance (FIGS. 4B and 4C). With a hydrophilic contact surface (static contact angle 45.6°), the representative force curves for water, ethylene glycol and methanol illustrate the transition from strong short-range forces facilitated by the Cassie state to weak capillary forces due to the Wenzel state (FIGS. 4D-4F). Liquid displacement ability of the fibrillar adhesive during contact depends on hydrophilicity/hydrophobicity of the contacting surface (FIG. 4G), which therefore significantly affects adhesion performance.

The approach of integrating recent advances in bioinspired adhesion and wetting research effectively provides a new perspective for robust soft fibrillar adhesive surfaces that can function in real-world applications with possible liquids on surfaces. The fibrils retain adhesion after repeated cycles (FIG. 10) and are highly resistant to damage. The scalable molding-based fabrication process according to the invention allows future scaled-up manufacturing of such liquid-superrepellent fibrillar adhesives for a wide range of industrial applications in apparel closures, robotics, automotive industry, medical devices, portable electronics, and manufacturing, where there could be oil on contact interfaces.

In the next section it is explained which materials and apparatuses were used for the experiments described above, where fibrils 8 were produced with a method according to the invention.

The fibrils 8 were designed using CAD software (Inventor Professional 2016, Autodesk Inc., San Rafael, CA, USA), converted to laser writing files (DeScribe, Nanoscribe GmbH, Karlsruhe, Germany) and printed using a laser 3D printer based on two-photon polymerization (Photonic Professional GT, Nanoscribe GmbH, Karlsruhe, Germany). The masters 10 were printed on 25 mm×25 mm×0.7 mm (thickness) indium tin oxide (ITO) coated glass substrates using the commercial IP-S photoresist (Nanoscribe GmbH, Karlsruhe, Germany). In order to enhance the adhesion of the photoresist to the substrate for molding purposes, the ITO coated glass was placed in a closed desiccator next to a droplet of 1,1,1,3,3,3-Hexamethyldisilazan (HMDS, Carl Roth GmbH, Karlsruhe, Germany) and left overnight. After exposure in the 3D laser printer, the master fibril array 12 was developed in propylene glycol monomethyl ether acetate (PGMEA, Sigma-Aldrich Inc., St. Louis, MO, USA) for 30 minutes, followed by a short rinse in isopropyl alcohol (IPA).

The fibril master mold 10 was first activated in an oxygen plasma chamber (model: Zepto, Diener electronic GmbH, Ebhausen, Germany) for 3 minutes at 90 Watt, and then fluorosilanized by placing it in a vacuum desiccator together with a glass vial containing 0.1 ml Trichloro(1 H,1H,2H, 2H-perfluorooctyl)silane (Sigma-Aldrich Inc., St. Louis, MO, USA) for 1 hour, followed by baking it in an oven at 90° C. for 1.5 hours. The fluorosilanized master substrate 10 was fixed to a larger, 80 mm×80 mm×1.8 mm, glass plate using a fast curing silicone (Flexitime Correct Flow, Kulzer GmbH, Hanau, Germany), and surrounded by 10 mm high, 50 mm×50 mm inner area walls made of Poly(methyl methacrylate) (PMMA) to limit the flow of PDMS during the following molding. To facilitate easier molding and demolding, a softer PDMS mixture 14 (20:1 base monomer to crosslinker ratio) was prepared and poured around the fluorosilanized master substrate 10 and after 15 min of degassing in a vacuum desiccator the PDMS 14 was allowed to flow over the master 10 by tilting the desiccator. The negative replica 16 was cured at room temperature for 48 hours, then in oven at 65° C. for 24 hours, and finally peeled off carefully.

The negative PDMS replica 16 was placed on a glass plate with the cavities facing up and activated in a UV-ozone chamber (model: PSDP-UVT, Novascan Technologies Inc., Boone, IA, USA) for 30 minutes and then fluorosilanized by placing it in a vacuum desiccator together with a glass vial containing 0.1 ml Trichloro(1H,1H,2H,2H-perfluorooctyl) silane (Sigma-Aldrich Inc., St. Louis, MO, USA) for 5 hours, followed by baking in oven at 90° C. for 1.5 hours. Standard PDMS (10:1 base monomer to crosslinker ratio) was prepared and poured on the fluorosilanized negative replica 16 around the cavity 18 array and limited by silicone walls and after 15 min of degassing in a vacuum desiccator the PDMS was allowed to flow over the negative replica 16 and into the cavities 18. The positive replica was cured at room temperature for 48 hours, then in oven at 65° C. for 24 hours, and finally peeled off carefully.

The surface wettability was characterized using the sessile drop method on a commercial contact angle measurement device (model: DSA100, Krüss GmbH, Hamburg, Germany). Advancing and receding contact angles of a ca. 2 µl droplet were measured three times at three different locations on each sample, for a total of nine measurements per liquid. Slow liquid dosing and aspiration speeds of 0.1-0.2 µl/s were used.

The custom adhesion setup was built around an inverted optical microscope (model: Axio Observer A1, Carl Zeiss AG, Oberkochen, Germany) connected to a video camera (model: Grasshopper 3, FLIR Systems Inc., Wilsonville, OR, USA) for visualization of the contact interface. Adhesion forces were recorded with a sensitive load cell (model: GSO-25, Transducer Techniques LLC, Temecula, CA, USA) mounted on a computer controlled high-precision motorized piezo stage (model: LPS-65 2', Physik Instrumente GmbH & Co. KG, Karlsruhe, Germany) moving in the z-direction with 5 nm positioning resolution. Another high-precision motorized piezo stage was used for y-direction. Fine adjustments in x- and y-direction are enabled by a manual xy-stage and tilt correction by two goniometers. Motion control of the piezo stages and data acquisition were done using custom software running on Ubuntu Linux. The load cell was connected to the computer through a signal conditioner (model: BNC-2110, National Instruments, Austin, TX, USA) and a data acquisition board (model: PCIe-6259, National Instruments, Austin, TX, USA).

For the adhesion measurements, a hemispherical smooth glass probe with a 4 mm radius of curvature was glued to the flat end of a holder that was directly connected to the load cell. The microfibrillar adhesive patches were placed on a glass slide underneath the probe, which was moved down at 25 µm/s until the desired preload force was reached. The preload was maintained for 10 s, after which the probe was retracted at 25 µm/s until the glass probe fully detached from the sample. Low approach and retraction velocities were employed in order to minimize viscoelastic effects. During the experiments the contact area was visualized by the microscope. For the adhesion characterization under wet and partially wet conditions, a 5 µl drop of liquid was applied onto the sample surface by a micropipette. Notably, due to the liquid super-repellent properties of the microfibrillar adhesives developed in this work, application of smaller droplets using a pipette was not possible. Droplets of low vapor pressure liquids were replaced after a few measurements in order to ensure consistent experimental conditions. In order to characterize the patterns under fully immersed wet condition, a fast curing silicone was employed to create a wall enclosing the micropatterns to limit the flow of 50 µl fluid. The glass probe was cleaned after each series of experiments with a particle-free tissue and isopropyl alcohol. A minimum of 10 measurements were carried out for each data point. The experiments were conducted at room temperature (23° C.) and a humidity of 30%.

Droplets of water and methanol were picked up from liquid super-repellent microfibrillar adhesive patches and placed on flat surfaces using the custom setup described above. Both the surface initially having the droplet (bottom surface) and the picking surface (top surface) had identical topography consisting of the same double re-entrant microfibril arrays. To facilitate the process, the bottom surface was fluorosilanized with Trichloro(1H,1H,2H,2H-perfluorooctyl)silane while the top surface remained untreated. The resulting surface energy contrast between the bottom and top surfaces was enough to make droplets stick slightly more to the untreated top surface, allowing them to be picked up from the fluorosilanized bottom surface. Since both surfaces were liquid super-repellent, the droplets maintained a highly spherical shape until placed down on a flat PDMS surface. Picking droplets was also demonstrated with the bottom surface attached to a highly curved, concave piece (half pipe) of plexiglass and the top surface accordingly to a convex half cylinder.

The simulation studies were conducted to analyze stress distributions for contact interfaces and fibril bodies when tensile load is applied. Using finite element analysis (FEA) in a commercial simulation software (COMSOL Multiphysics 5.4, COMSOL Inc., Burlington, MA, USA), the stress distribution at the contact interface was studied following the numerical approach. In addition to interfacial stress, we further studied stress distribution on the fibril body to identify where the maximum stress appears due to the unconventional shape of the fibril. For the simulation, the fibril was assumed fixed at the base and fibril top initially attached to a flat rigid surface (probe), while tensile load was applied to the far end of the probe. The hyperelastic behavior of the stretched fibril was represented by the Mooney-Rivlin hyperelastic model. Stresses were analyzed at infinitesimal stretch and 25% stretch of the fibril body, and normalized to the maximum stress occurring at the fibril base. A total of 11278 free quadrilateral elements were used, with extremely fine meshes for the contact interface and edge of the fibril top. Material properties in the simulation were chosen for PDMS cured in room temperature (25° C.), where the Young's modulus is 1.32 MPa and the Poisson's ratio 0.499. The Mooney-Rivlin model parameters were 75.5 kPa (C10) and 5.7 kPa (CO1).

In the next sections FIGS. 5 to 10 are discussed.

FIGS. 5A-5E show fibril tip designs (top row) and SEM micrographs of corresponding 3D microprinted rigid half fibrils (bottom row). The scale bars are of a size of 10 μm. These designs were replicated in PDMS and their adhesion evaluated (FIG. 3B).

FIG. 6 shows the fibrillary adhesive wettability dependency on pitch with advancing (θadv) and receding (θrec) contact angles of perfluorohexane ($\gamma$=11.91 mN/m), methanol ($\gamma$=22.7 mN/m), dipropylene glycol ($\gamma$=33.90 mN/m), ethylene glycol ($\gamma$=47.7 mN/m) and water ($\gamma$=72.8 mN/m) on the PDMS fibrillar adhesive as a function of fibril center-to-center distance. The fibril tip diameter D is 28 μm for all measurements. Perfluorohexane was only suspended with a pitch of 60 μm and collapsed to a Wenzel state in all other cases. The presented values are means and error bars represent standard deviation (n=9).

FIG. 7 is a photograph of a custom built setup used in the adhesion measurements described above with the inset showing a close-up of the load cell and the attached glass probe used as the contacting surface.

FIG. 8. shows the adhesion dependency on preload, i.e. the adhesion of the PDMS fibrillar adhesive against a smooth hemispherical glass probe (radius of curvature 4 mm) as a function of the applied preload force. The fibril tip diameter D was 28 μm and preload was applied for a duration of 10 seconds. The presented values are means and error bars represent standard deviation (n=3).

FIGS. 9A to F show different FE simulations of PDMS fibrils under tensile load, wherein FIGS. 9A to C represent cross-sectional views of normal stress heat maps by (A) infinitesimal stretch, (B) 12.5% stretch and (C) 25% stretch. FIGS. 9D to F, on the other hand, show interfacial normalized normal and shear stress profiles by (D) infinitesimal stretch, (E) 12.5% stretch and (F) 25% stretch. The stress values are normalized by the normal stress at the fibril base in each case. The normal stress trend from infinitesimal stretch to 25% stretch (A-C) shows that the stress is mostly concentrated on the neck and around the center axis and remains low at the overhang structure. Especially at the interface (D-F) both normal and shear stress around the center axis increase by tensile stretch, while remaining low at the edge. This suggests that the overhang structure does not interfere with adhesion performance but rather helps by preventing peeling initiated from the fibril edge.

FIG. 10 represents the adhesion of the PDMS fibrillar adhesive over 30 cycles of repeated measurements for a fibril cap diameter D of 28 μm and a preload force of 5 mN. As commonly seen for fibrillar adhesives, the first measurement yields a considerably higher adhesion and then quickly stabilizes. The presented values are single measurements carried out sequentially on the same spot.

The invention claimed is:

1. A method of producing a fibrillary dry adhesive material having a plurality of fibrils, the fibrils having a tip and a body, the tip having a larger outer dimension than the body, wherein the fibril tip comprises a double re-entrant tip geometry, which comprises a mushroom shape with an undercut remote from a top surface of the fibril tip, the method comprising the following sequence of steps:
    a) providing a negative mold having a surface and comprising cavities having a shape corresponding to an outer shape of the fibrils to be produced, wherein the mold is formed of a first material, either
    b1) activating said surface and said cavities of said mold and then passivating the first material by providing a silane another chemical treatment to the activated first material; or
    b2) providing a polymer coating to said surface and said cavities; and then
    c) applying vacuum to remove air out of the cavities;
    d) filling the cavities with a second material;
    e) curing the second material to produce at least the fibrils optionally keeping some of the second material as a backing substrate to hold the fibrils together; and optionally
    f) demolding the first material from the second material to obtain said fibrils at said second material.

2. The method according to claim 1, wherein the step of activating comprises one of the provision of oxygen at the first material and then applying UV radiation at the oxygen atoms to produce ozone; and the provision of an oxygen plasma at the first material.

3. The method according to claim 1, further comprising the steps of:
    a) producing a master having a surface and comprising patterns of the plurality of fibrils;
    b1) activating said surface and said patterns of said master and then passivating the master material by providing a silane or polymer coating or another chemical treatment to the activated master material;
    b2) providing a polymer coating to said surface and said patterns;
    c) covering the prepared patterns of the plurality of fibrils with the first material;
    d) curing the first material;
    e) removing the master to produce the negative mold.

4. The method according to claim 3, wherein the step of activating the patterns of the plurality of fibrils comprises one of the provision of oxygen at the master material and then applying UV radiation at the oxygen atoms to produce ozone; and the provision of an oxygen plasma at the master material.

5. The method according to claim 1, wherein at least one of the first material and the second material has a Young's modulus selected in the range of 10 kPA to 5000 MPa.

* * * * *